(12) United States Patent
Ishigaki

(10) Patent No.: US 7,403,801 B2
(45) Date of Patent: Jul. 22, 2008

(54) PORTABLE TELEPHONE WITH BOOKMARK SORT FUNCTION

(75) Inventor: Junji Ishigaki, Hachioji (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 362 days.

(21) Appl. No.: 09/794,504

(22) Filed: Feb. 26, 2001

(65) Prior Publication Data

US 2001/0018353 A1  Aug. 30, 2001

(30) Foreign Application Priority Data

Feb. 29, 2000 (JP) .................. P. 2000-054918

(51) Int. Cl.
*H04B 1/38* (2006.01)

(52) U.S. Cl. .................. 455/566; 707/3; 707/200; 709/218

(58) Field of Classification Search .................. 455/566, 455/466; 345/357; 709/218, 219; 707/10, 707/200, 3; 713/202; 715/501.1
See application file for complete search history.

(56) References Cited

U.S. PATENT DOCUMENTS

| | | | |
|---|---|---|---|
| 5,907,322 A | | 5/1999 | Kelly et al. |
| 6,173,285 B1 * | | 1/2001 | Nishita et al. .................. 707/10 |
| 6,184,886 B1 * | | 2/2001 | Bates et al. .................. 345/357 |
| 6,199,077 B1 * | | 3/2001 | Inala et al. .................. 715/501.1 |
| 6,278,993 B1 * | | 8/2001 | Kumar et al. .................. 707/3 |
| 6,292,668 B1 * | | 9/2001 | Alanara et al. .................. 455/466 |
| 6,560,640 B2 * | | 5/2003 | Smethers .................. 709/219 |
| 6,957,233 B1 * | | 10/2005 | Beezer et al. .................. 707/200 |
| 2001/0018353 A1 * | | 8/2001 | Ishigaki .................. 455/566 |
| 2002/0035613 A1 * | | 3/2002 | Hirayama .................. 709/218 |

FOREIGN PATENT DOCUMENTS

| | | |
|---|---|---|
| EP | 0 903 910 | 3/1999 |
| EP | 0 953 926 | 11/1999 |
| EP | 1130889 | * 2/2001 |
| KR | 1999-011504 | 2/1999 |
| KR | 2000-0008813 | 2/2000 |
| WO | WO 00/01142 | 1/2000 |

OTHER PUBLICATIONS

Netscape Communicator 4.75, 1994.*

* cited by examiner

*Primary Examiner*—William D Cumming
(74) *Attorney, Agent, or Firm*—Pearne & Gordon LLP

(57) ABSTRACT

The Bookmark list display control program rearranges and reads the sites in the Bookmark storage area in reverse chronological order of access to sites, then displays the Bookmark list (step 51). Next, it is determined whether the target (desired) site or URL is present or not (step 52). In case the target site or URL is present, the user is automatically connected to the target site or URL by selecting the target site or URL (step 53). In case the target site or URL is absent in step 52, the user selects the Bookmark input mode and enters a new site or URL (step 54). Then, the user stores the new site or URL in the Bookmark storage area, or in case the memory of the area is insufficient, the user overwrites an old Bookmark site with this new site (step 55).

3 Claims, 6 Drawing Sheets

PORTABLE TELEPHONE WITH BOOKMARK SORT FUNCTION

BACKGROUND OF THE INVENTION

The present invention relates to a URL display method in a portable telephone having the non-voice information communications mode (for example i-mode) function and a portable telephone using the URL display method. The invention is particularly to display the title or URL of a site that was selected last time at the top of a Bookmark list on the screen, when a site registered to the Bookmark is selected. The non-voice information communications mode is the operation mode for the online data service using digital portable telephones, wherein a service to connect to sites (programs) registered in a center, an internet connection service, a message service, and e-mail service (for example, i-mode mail) are available.

Conventionally, in a portable telephone having the non-voice information communications mode function, the user can activate the Bookmark operation mode to display a Bookmark list. To call a site (program) registered to the Bookmark, the user selects a target site (program) or URL (Universal Resource Locator) with a Bookmark list displayed shown in FIG. 6. This connects the user to the target site or URL.

Here, a "site (program)" is displayed in title name. The user can enter the operation mode of the online data browsing service by using a portable telephone having the non-voice information communications mode function and for example connect to a site to obtain stock price information, various event information or weather forecast information.

In a portable telephone having the non-voice information communications mode function according to the related art, a site that has been registered to the Bookmark is displayed in a fixed position of the screen. In case the Bookmark list in FIG. 6 is displayed, position of each site in the list remains unchanged when the Bookmark list is displayed next time.

The user can connect to the site (program) "stock price" shown in FIG. 6A without scrolling through the screen by using a navigation key. The problem is that the user has to scroll through the screen by using the navigation key to select the site "weather" shown in FIG. 6B.

SUMMARY OF THE INVENTION

The invention, proposed to solve such a problem, aims at providing a URL display method in a portable telephone adapted to display the title or URL of a site that was selected last time at the top of a Bookmark list on the screen, when a site registered to the Bookmark is selected, and a portable telephone using the URL display method.

The first aspect of the invention is a URL display method in a portable telephone having the non-voice information communications mode function, characterized in that the URL display method is adapted to display the title or URL of a site at the top of a Bookmark list on the screen when the Bookmark list is displayed, the site or URL selected from the Bookmark list displayed with the Bookmark operation mode activated last time in order to obtain desired information. Via this configuration, it is possible to display the title or URL of a site that was selected last time at the top of a Bookmark list on the screen, when a site registered to the Bookmark is selected.

The second aspect of the invention is a portable telephone adapted to obtain the information on a desired site or URL by using the URL display method according to the first aspect of the invention. Via this configuration, it is possible to obtain information on a desired site or URL via a simple operation.

DETAILED DESCRIPTION OF THE PREFERRED EMBODIMENT

Figure 1:
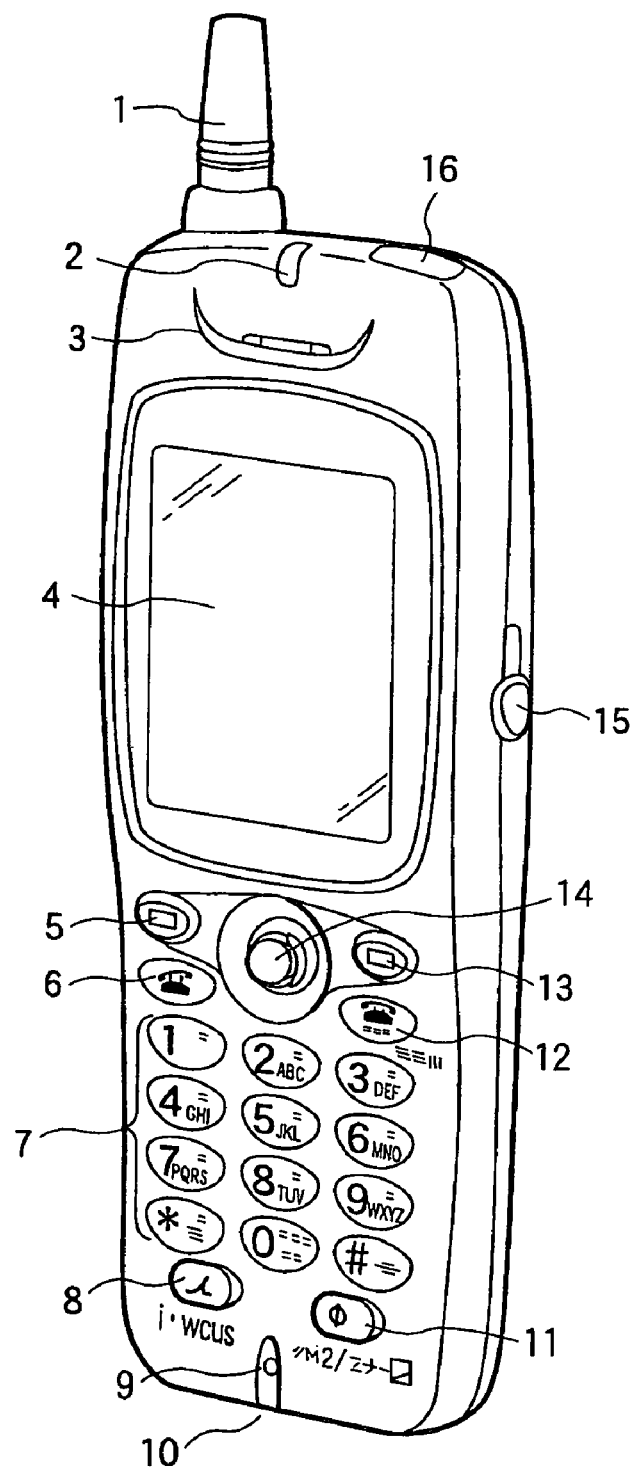
FIG. 1 is a front view showing a configuration of a portable telephone according to an embodiment of the invention.

An embodiment of the invention will be described referring to FIGS. 1 through 6. FIG. 1 is a schematic diagram showing the structure of portable telephone equipped with the non-voice information communications mode (for example i-mode) function according to the embodiment of the invention. In FIG. 1, the portable telephone according to the embodiment of the invention comprises an antenna 1, a incoming/charge lamp 2, a receiver 3, an LCD display 4, a left soft key 5 also serving as a telephone directory button, a call start button 6, a ten-digit keypad or dial keys 7, a warp (jump) key 8 for switching to the non-voice information communications operation mode, a transmitter 9, an external connection terminal 10, a voice/manner key 11, a power/end/hold key 12, a right soft key 13 also serving as a redial/clear button, a navigation key 14 for scrolling through the display in four directions (up, down, right and left) and determining the target display by pressing the center button, an earphone microphone terminal 15, and an infrared communications port 16.

Figure 2:
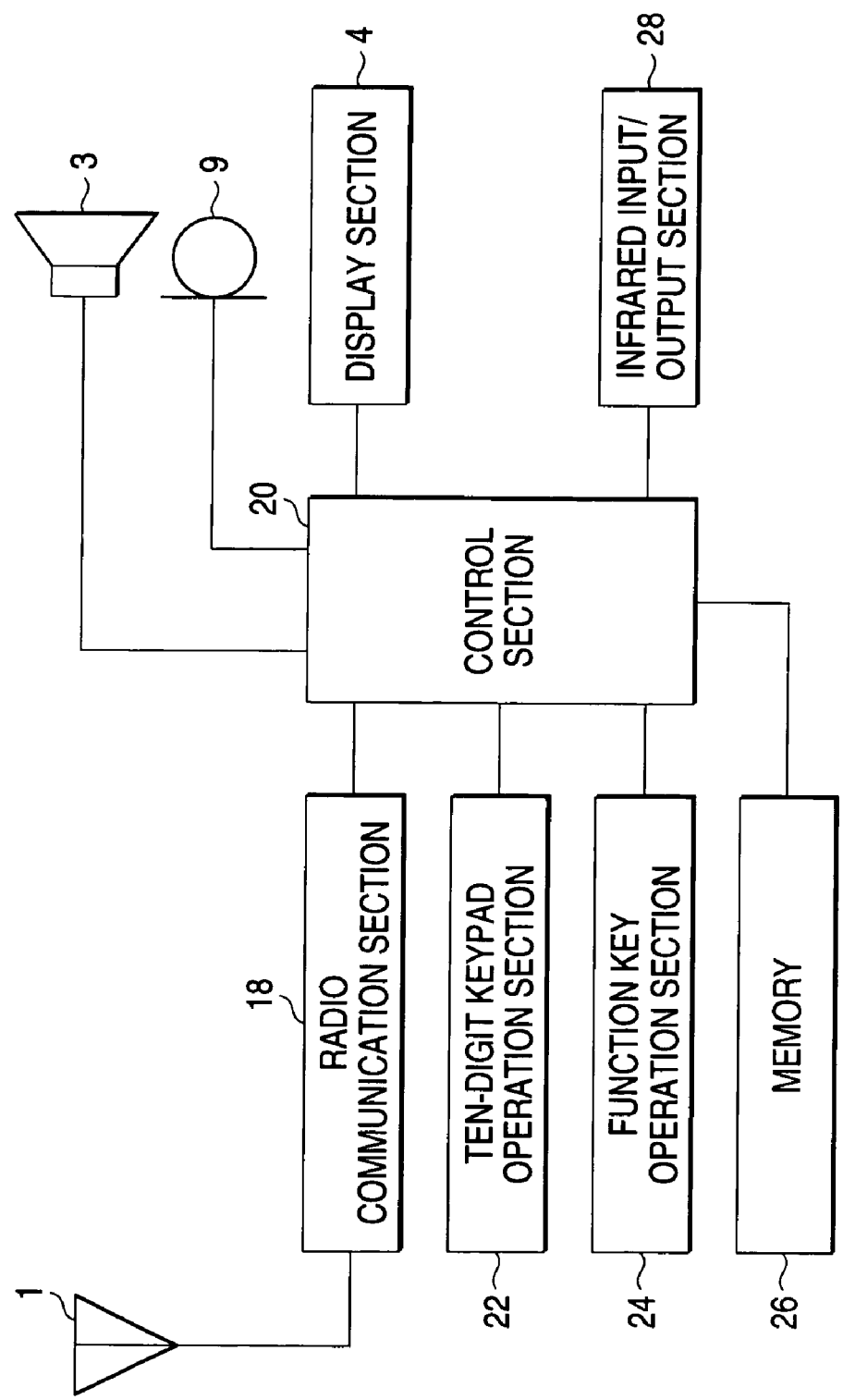
FIG. 2 shows a circuit block for realizing the portable telephone in FIG. 1.

FIG. 2 shows a circuit block for realizing a portable telephone of the aforementioned configuration. In FIG. 2, the portable telephone receives radio waves via the antenna 1 at a receiver (not shown) in a radio communications section 18. Received information is transmitted to a controller 20. The controller 20 displays the received information such as the received telephone number on the display 4 such as an LCD. The controller 20 converts the received information to voice information and outputs in voice via a speaker (receiver) 3 of the receiver section. A transmitter (microphone) 9 receives the user's voice and transmits the voice to the controller 20, which transmits the voice information to the distant party via radio communications by way of a transmitter (not shown) in the radio communications section 18 and the antenna 1.

The controller 20 stores voice information such as speech contents during conversation in a memory 26 or reads information therefrom. A ten-digit key pad operation section 22 inputs dial signals to the controller 20 via operation of the ten-digit keypad 7. A function key operation section 24 inputs operation of a function key, such as operation of the navigation key 14 to the controller 20. An infrared input/output section 28 transmits/receives infrared signals via the infrared communications port 16.

The controller 20 makes control so that, in case the Bookmark operation mode is activated and a desired site or URL is selected from the Bookmark list shown on the display 4 and desired information is obtained, the site or URL selected last time is displayed at the top of the Bookmark list on the screen when the bookmark list is displayed next time. These circuit blocks are housed in the cabinet in FIG. 1.

Figure 3:
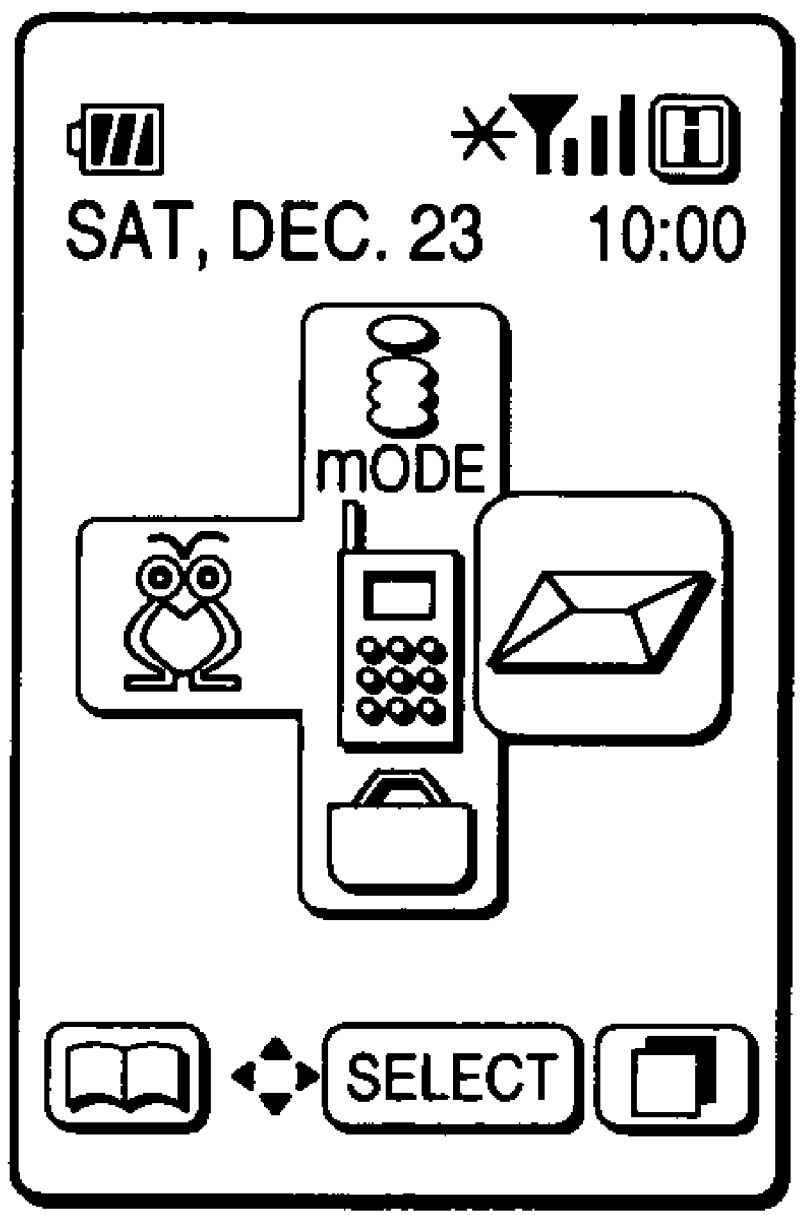
FIG. 3 shows an example of an icon screen displayed on the display of the portable telephone in FIG. 1 in the call incoming wait state.

FIG. 3 shows an example of an icon screen displayed in the call incoming wait state. In this example, the icon screen is displayed in the shape the icon screen is displayed in a cross. From top to down in clockwise direction, an i-mode main icon, an i-mode mail icon, a telephone directory icon, a screen icon, and a menu icon in the center are respectively displayed. A selected icon screen is displayed in a scaled-up image to indicate which icon screen is currently selected.

FIG. 4 shows a transition of the display screen of a portable telephone to describe the embodiment of the invention. In the portable telephone according to this embodiment, in order to call the Bookmark, the user selects the "i-mode" icon on the icon screen shown in FIG. 4A to display the "i-mode main" screen, then presses the up or down scroll key of the navigation key 14 to call the target site or URL.

Figure 4A:
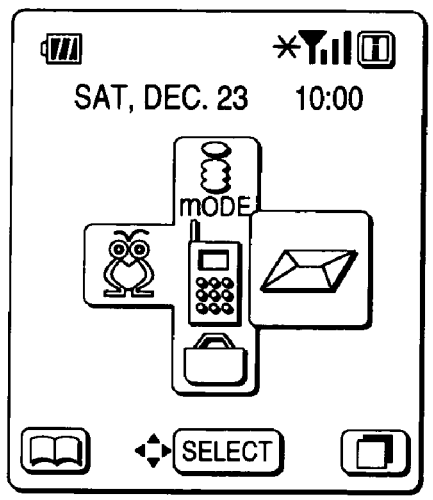
FIG. 4 shows a transition of the display screen of a portable telephone to describe the embodiment of the invention.
Figure 4B:
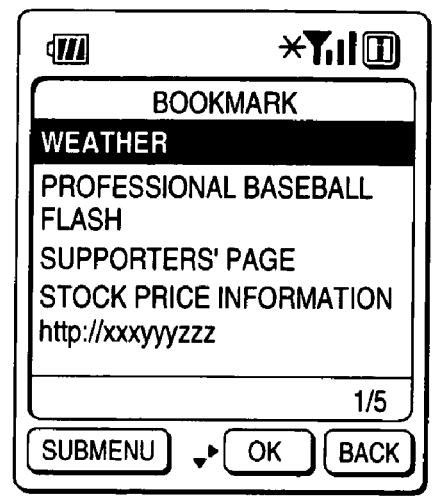

This displays the Bookmark list shown in FIG. 4B. The user calls a target "site (program)" or URL by using the up or down scroll key of the navigation key 14. In case the user does not operate the up or down scroll key of the navigation key 14 in FIG. 4B, he/she can call the highlighted site "weather" at the top of the screen display.

Here, "site (program)" is displayed in title name. The user can connect to a site registered to the Bookmark to obtain stock price information or various event information by using a portable telephone (digital portable telephone) having the non-voice information communications mode (for example i-mode) function.

Figure 4C:

In case the "site (program)" that the user wish to call is the "professional baseball flash" shown in FIG. 4C, the user presses the up or down scroll key of the navigation key 14 to select the site then uses the selection key of the navigation key 14 to validate the selection. This connects the user to the "professional baseball flash" as a target "site (program)".

Figure 4D:
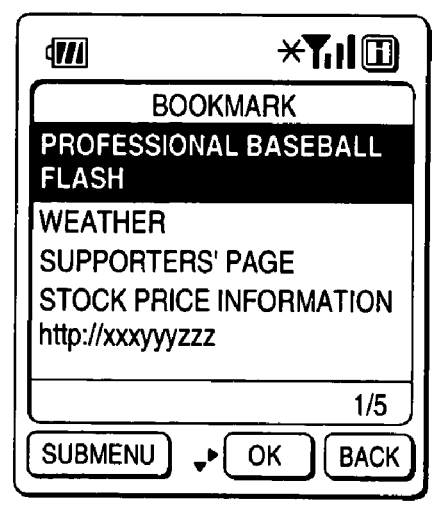

While connection to a "site (program)" is complete as understood from in the foregoing description, in a portable telephone according to this embodiment, in case a target "site (program)" is called once from the Bookmark list, the "site (program)" called last time is displayed at the top of the Bookmark list on the screen next time as shown in FIG. 4D.

In order to display the title of the "site (program)" called last time, the controller 20 in FIG. 2 activates a Bookmark list display control program for controlling display of the Bookmark list. When activated, the Bookmark list display control program sorts or rearranges the Bookmark-registered sites according to the latest access date and time stored in a predetermined are a of the memory 26 that stores the sites, to display the Bookmark list in reverse chronological order of access to sites. This provides the user with an advantage that the user can easily call or connect to a site (program) that is frequently called, thus providing an easy-to-use site connection procedure.

Figure 5:
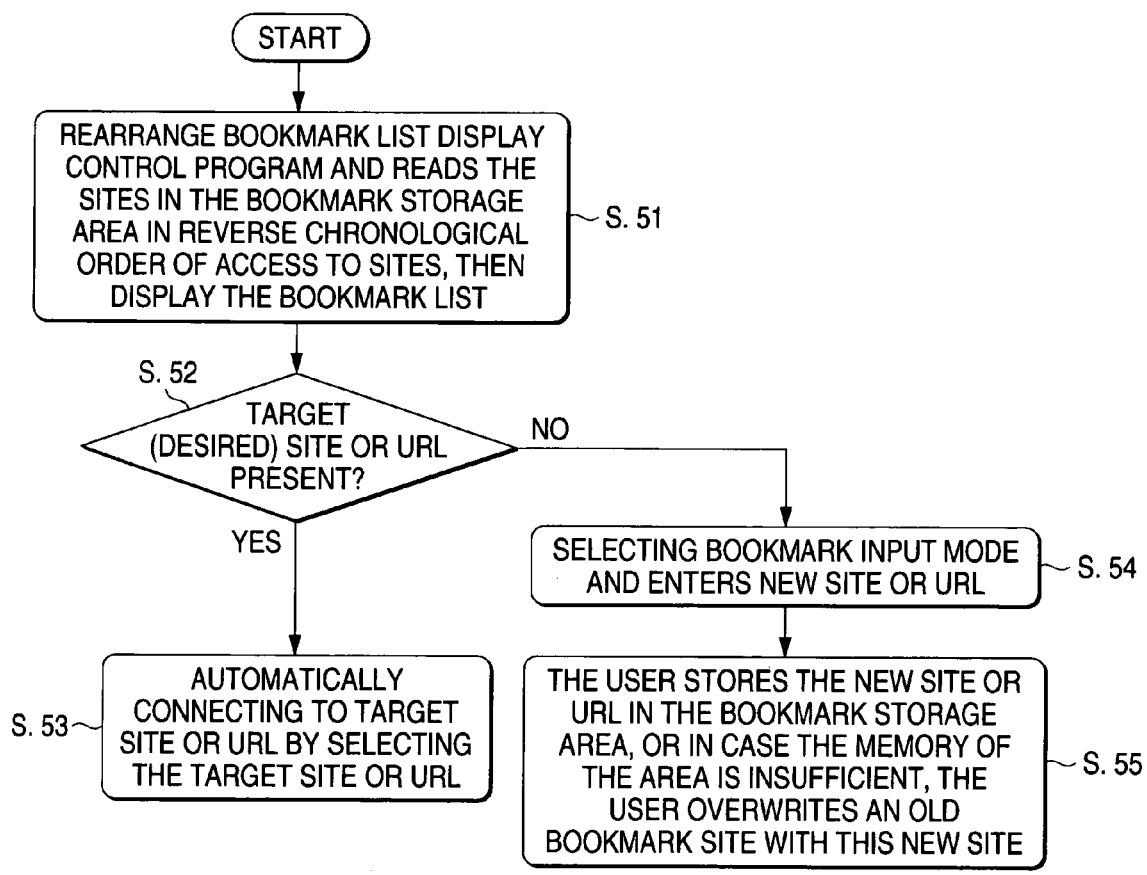
FIG. 5 is a flowchart explaining the operation to display the title of the "site (program)" last time at the top of the screen.
Figure 6A:
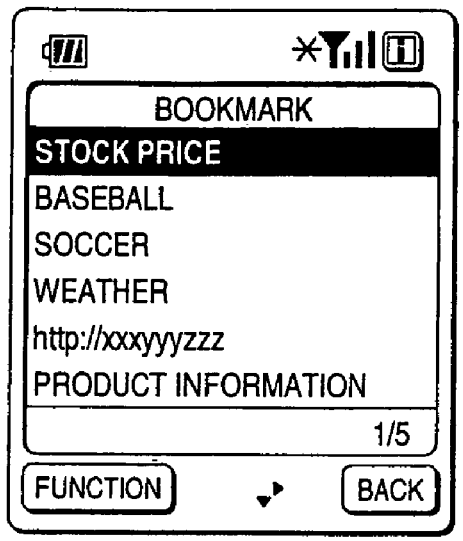
FIG. 6 shows a Bookmark list display screen on a portable telephone according to the related art.
Figure 6B:
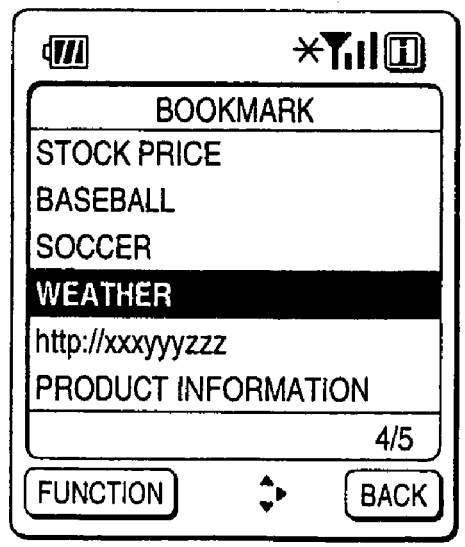

FIG. 5 is a flowchart explaining the operation to display the title of the "site (program)" last time at the top of the screen. In FIG. 5, the Bookmark list display control program rearranges and reads the sites in the Bookmark storage area in reverse chronological order of access to sites, then displays the Bookmark list (step 51). Next, it is determined whether the target (desired) site or URL is present or not (step 52). In case the target site or URL is present, the user is automatically connected to the target site or URL by selecting the target site or URL (step 53). In case the target site or URL is absent in step 52, the user selects the Bookmark input mode and enters a new site or URL (step 54). Then, the user stores the new site or URL in the Bookmark storage area, or in case the memory of the area is insufficient, the user overwrites an old Bookmark site with this new site (step 55).

As mentioned earlier, the first aspect of the invention is a URL display method in a portable telephone having the non-voice information communications mode function, characterized in that the URL display method is adapted to display the title or URL of a site at the top of a Bookmark list on the screen when the Bookmark list is displayed, the site or URL selected from the Bookmark list displayed with the Bookmark operation mode activated last time in order to obtain desired information. This configuration has an advantage that it is possible to display the title or URL of a site that was selected last time at the top of a Bookmark list on the screen, when a site registered to the Bookmark is selected.

The second aspect of the invention is a portable telephone adapted to obtain the information on a desired site or URL by using the URL display method according to the first aspect of the invention. This configuration has an advantage that it is possible to obtain information on a desired site or URL via a simple operation.

What is claimed is:

1. A portable telephone comprising:
    a display operable to display a bookmark list, the bookmark list showing a plurality of titles or universal resource locators (URLs), the titles or URLs are associated with a plurality of sites registered in the bookmark list;
    an input device operable to select a title or URL from the bookmark list; and
    a controller operable to activate a bookmark list display control program after selecting the title or URL, the bookmark list display program places the selected title or URL at the top of the bookmark list so as to rearrange the bookmark list;
    wherein said display of said portable telephone displays the bookmark list with the selected title or URL at the top of the bookmark list after said controller places the selected title or URL at the top of the bookmark list.

2. The portable telephone of claim 1, wherein the selected title or URL at the top of the bookmark list is highlighted on the display of the portable telephone.

3. A portable telephone displaying titles or URLs of a plurality of sites registered in a bookmark list, said portable telephone comprising:
    a receiver section for receiving predetermined information of a site among the plurality of sites;
    a control section for arranging the title or URL of said plurality of sites registered in said bookmark list after receiving the predetermined information so that the title or URL of the site of which the predetermined information is received is located at the top of the bookmark list;
    a display section for displaying the title or URL of the plurality of sites in the arranged order; and
    a highlighting section for highlighting the title or URL at the top of a bookmark list on the screen.

* * * * *